(12) United States Patent
Je et al.

(10) Patent No.: US 10,604,176 B2
(45) Date of Patent: Mar. 31, 2020

(54) MOTOR DRIVING CONTROL APPARATUS AND STEERING SYSTEM

(71) Applicant: MANDO CORPORATION, Gyeonggi-do (KR)

(72) Inventors: Kyu Yeong Je, Gyeonggi-do (KR); YoungHoon Lee, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 16/057,802

(22) Filed: Aug. 7, 2018

(65) Prior Publication Data

US 2019/0047615 A1    Feb. 14, 2019

(30) Foreign Application Priority Data

Aug. 8, 2017   (KR) .......................... 10-2017-0100410

(51) Int. Cl.
| H02P 1/00 | (2006.01) |
| H02P 3/00 | (2006.01) |
| H02P 5/00 | (2016.01) |
| B62D 5/04 | (2006.01) |
| H02P 29/024 | (2016.01) |
| H02P 27/06 | (2006.01) |
| H02H 1/00 | (2006.01) |

(52) U.S. Cl.
CPC ........... *B62D 5/0487* (2013.01); *B62D 5/046* (2013.01); *B62D 5/0484* (2013.01); *H02H 1/00* (2013.01); *H02P 27/06* (2013.01); *H02P 29/024* (2013.01); *H02P 2201/03* (2013.01)

(58) Field of Classification Search
CPC .......................... B62D 5/0487; H02P 29/0241
USPC ........................................................ 318/139
See application file for complete search history.

(56) References Cited

U.S. PATENT DOCUMENTS

| 8,499,885 B1 * | 8/2013 | Satou | H02P 6/12 180/443 |
| 2012/0161681 A1 * | 6/2012 | Kuroda | B62D 5/0481 318/400.21 |
| 2013/0257328 A1 * | 10/2013 | Arai | H02P 29/0241 318/400.22 |
| 2016/0339949 A1 * | 11/2016 | Mori | B62D 5/0484 |

\* cited by examiner

*Primary Examiner* — Erick D Glass
(74) *Attorney, Agent, or Firm* — Ladas & Parry, LLP

(57) ABSTRACT

Provided are a motor driving control apparatus and a steering system. The motor driving control apparatus includes an inverter circuit configured to supply a motor driving power to a motor for steering assist, a motor control circuit configured to control operation of the inverter circuit according to whether a control power is input, and a switch circuit configured to control whether to input the control power to the motor control circuit in response to a control signal. When a failure occurs inside or outside the steering system, the apparatus and steering system can immediately stop motor driving for steering assist and thereby prevent a vehicle accident.

20 Claims, 10 Drawing Sheets

MOTOR DRIVING CONTROL APPARATUS AND STEERING SYSTEM

CROSS REFERENCE TO RELATED APPLICATION

This application claims priority from Korean Patent Application No. 10-2017-0100410, filed on Aug. 8, 2017, which is hereby incorporated by reference for all purposes as if fully set forth herein.

BACKGROUND OF THE INVENTION

1. Field of the Invention

The present disclosure relates to a motor driving control apparatus and a steering system.

2. Description of the Prior Art

Related arts employ a steering system that provides a part of steering torque, which should be applied to a steering wheel by a driver in order to steer a vehicle, by using an auxiliary power source and thereby facilitates steering.

Such a steering system senses a driver's steering intention through a torque sensor directly connected to the steering wheel and controls driving of a motor by considering a current velocity and the like of the vehicle as a sensing result to provide a proper assist steering force, thereby assisting the driver's steering force.

Sometimes, when a failure occurs inside or outside the steering system due to an unpredictable reason, the steering function of the steering system may fail.

For this reason, a technology for sensing and coping with a failure inside or outside the steering system is under development, but there has been a problem that motor driving for steering assist is not immediately stopped.

SUMMARY OF THE INVENTION

In this background, the present disclosure is to provide a motor driving control apparatus and a steering system that, when a failure occurs inside or outside a steering system, may immediately stop motor driving for steering assist and thereby prevent a vehicle accident.

Also, the present disclosure is to provide a motor driving control apparatus which may be miniaturized and may prevent noise caused by motor driving control, and a steering system including the same.

An embodiment provides a motor driving control apparatus including: an inverter circuit configured to supply a motor driving power to a motor for steering assist; a motor control circuit configured to control operation of the inverter circuit according to whether a control power is input; and a switch circuit configured to control whether to input the control power to the motor control circuit in response to a control signal.

Another embodiment provides a steering system including: a motor configured to provide an assist steering force; a motor driving power source configured to supply a motor driving power for driving the motor; and a motor driving control apparatus configured to control driving of the motor.

The motor driving control apparatus in the steering system may include: an inverter circuit configured to supply the motor driving power to the motor for steering assist; a motor control circuit configured to control operation of the inverter circuit according to whether a control power is input; and a switch circuit configured to control whether to input the control power to the motor control circuit in response to a control signal.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
FIG. 1 is a diagram showing a steering system according to an embodiment of the present disclosure.

Hereinafter, embodiments of the present disclosure will be described in detail with reference to the accompanying drawings. In adding reference numerals to elements in each drawing, the same elements will be designated by the same reference numerals if possible, although they may be shown in different drawings. Further, in the following description of the present disclosure, a detailed description of known functions or configurations incorporated herein will be omitted when it is determined that the description may make the subject matter of the present disclosure rather unclear.

In describing elements of embodiments of the present disclosure, terms such as "first," "second," "A," "B," "(a)," and "(b)" may be used. Such terms are used only to distinguish an element from another element, but do not limit the substance, sequence, order, number, or the like of elements. It should be noted that when one component is described as being "connected," "coupled," or "joined" to another component, still another component may be "connected," "coupled," or "joined" between the two components, even though the component may be directly "connected," "coupled," or "joined" to the other component.

FIG. 1 is a diagram showing a steering system 10 according to an embodiment of the present disclosure.

Referring to FIG. 1, the steering system 10 according to an embodiment of the present disclosure is a system for assisting a steering force by using a motor M and may also be referred to as an electronic power steering (EPS) apparatus, a motor-driven power steering (MDPS) apparatus, or the like.

Referring to FIG. 1, the steering system 10 according to an embodiment of the present disclosure may include a motor M which provides an assist steering force, a motor driving power source 110 which supplies a motor driving power Pm for driving the motor M, and a motor driving control apparatus 100 which controls driving of the motor M, and the like.

In addition to the apparatuses for steering assist, such as the motor M, the motor driving power source 110, and the motor driving control apparatus 100, the steering system 10 may include fundamental mechanical steering apparatuses, such as a steering shaft, a rack bar, and a gear box.

The motor M in the steering system 10 may provide an assist steering force at various positions on a steering force transmission path (e.g. steering wheel—steering shaft—gear box—rack bar—wheel).

Meanwhile, when a problem occurs in a steering function, the steering system 10 according to an embodiment of the present disclosure may prevent a vehicle accident by providing a fail safety function of immediately stopping steering assist.

When a failure (problem) in the steering function is sensed, it is necessary to immediately and accurately stop steering assist so that the fail safety function may be performed normally.

To this end, the steering system 10 according to an embodiment of the present disclosure provides a means for immediately and accurately stopping steering assist when a failure (problem) in the steering function is sensed.

Here, a general method may be used to sense a failure in the steering function, and it is possible to sense a steering angle, a torque, a current, etc. and determine whether a failure in the steering function has occurred on the basis of the sensing results.

The steering system 10 for immediately and accurately stopping steering assist will be described below.

Figure 2:
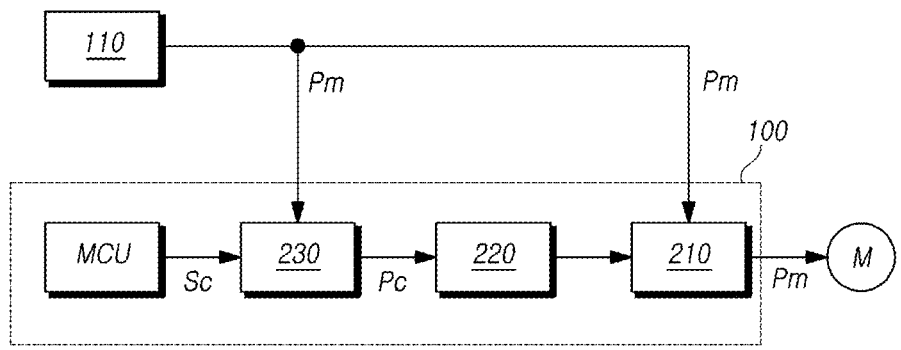
FIG. 2 is a diagram schematically showing a motor driving control apparatus according to an embodiment of the present disclosure.

FIG. 2 is a diagram schematically showing the motor driving control apparatus 100 according to an embodiment of the present disclosure.

Referring to FIG. 2, the steering system 10 according to an embodiment of the present disclosure may include the motor driving control apparatus 100 capable of controlling motor driving to immediately and accurately stop steering assist when a failure in the steering function is sensed.

Referring to FIG. 2, the motor driving control apparatus 100 according to an embodiment of the present disclosure may include an inverter circuit 210 which supplies the motor driving power Pm to the motor M for steering assist, a motor control circuit 220 which controls operation of the inverter circuit 210 according to whether a control power Pc is input, a switch circuit 230 which controls whether to input the control power Pc to the motor control circuit 220 in response to a control signal Sc, and the like.

The inverter circuit 210 functions to change a rotation speed, a rotation direction, etc. of the motor M.

Referring to FIG. 2, the motor driving control apparatus 100 according to an embodiment of the present disclosure may further include a micro control unit (MCU) which outputs the control signal Sc to the switch circuit 230 according to whether a steering function failure event has occurred.

FIG. 2 shows that the MCU is present in the motor driving control apparatus 100, but the MCU may be present outside the motor driving control apparatus 100 in some cases.

Referring to FIG. 2, the motor control circuit 220 may control the inverter circuit 210 to supply the motor driving power Pm to the motor M when the control power Pc is input, and may control the inverter circuit 210 not to supply the motor driving power Pm to the motor M when input of the control power Pc is interrupted.

In other words, the motor control circuit 220 may control the inverter circuit 210 to supply the motor driving power Pm to the motor M when the control power Pc is input, and may control the inverter circuit 210 not to supply the motor driving power Pm to the motor M when the control power Pc is not input.

That is, the motor M may be driven or not according to whether the control power Pc is input to the motor control circuit 220.

When the switch circuit 230 performs a switching operation in response to the control signal Sc, the control power Pc is input or not to the motor control circuit 220.

The switch circuit 230 may be implemented as a switch element, such as a transistor, and may be implemented as a simple electronic switch circuit when power consumption of the motor control circuit 220 is considerably low.

In this specification, a transistor constituting an element of each circuit denotes an active semiconductor device with three or more terminals. The transistor encompasses bipolar semiconductor devices (junction transistors) and unipolar semiconductor devices (field effect transistors (FETs)) and is not limited to a transistor in a specific form.

Figure 3:
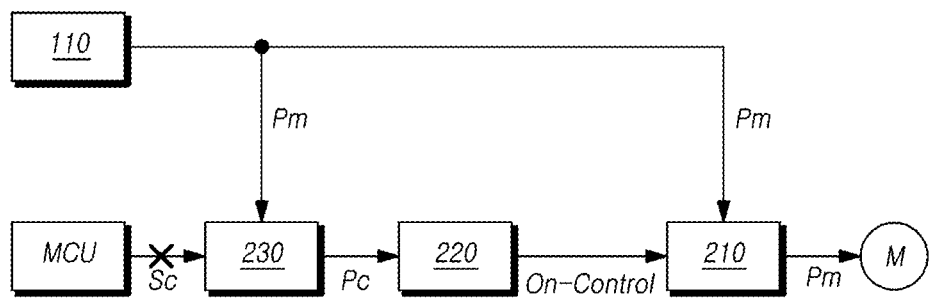
FIGS. 3 and 4 are diagrams showing operation of a motor driving control apparatus according to an embodiment of the present disclosure depending on whether a steering function failure event has occurred.
Figure 4:
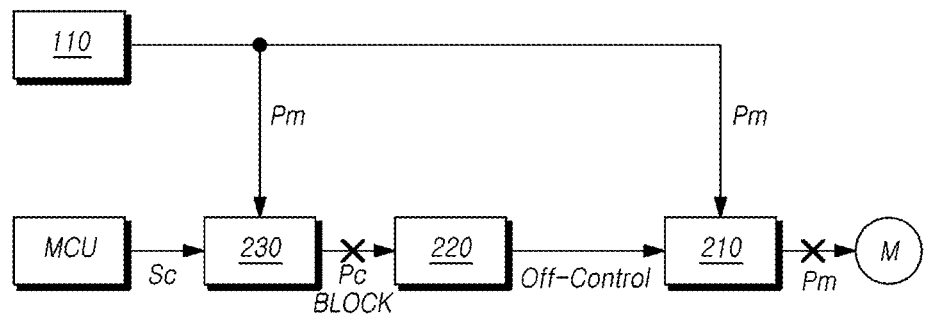

FIGS. 3 and 4 are diagrams showing operation of the motor driving control apparatus 100 according to an embodiment of the present disclosure depending on whether a steering function failure event has occurred.

Referring to FIG. 3, for example, when no steering function failure event has occurred, the MCU may not output the control signal Sc or may output the control signal Sc at a first voltage level.

In this case, the switch circuit 230 outputs the control power Pc to the motor control circuit 220.

When the control power Pc is input, the motor control circuit 220 may perform on-control so that the inverter circuit 210 may supply the motor driving power Pm to the motor M.

Accordingly, a motor shaft of the motor M is rotated by the supplied motor driving power Pm and may provide an assist steering force for normal steering assist.

Referring to FIG. 4, for example, when a steering function failure event has occurred, the MCU may output the control signal Sc or may output the control signal Sc at a second voltage level.

In this case, the switch circuit 230 blocks the control power Pc without outputting the control power Pc to the motor control circuit 220.

Since the control power Pc is not input, the motor control circuit 220 may perform off-control so that the inverter circuit 210 may not supply the motor driving power Pm to the motor M.

Since the motor driving power Pm is not supplied, the motor M provides no assist steering force for steering assist.

Figure 5:
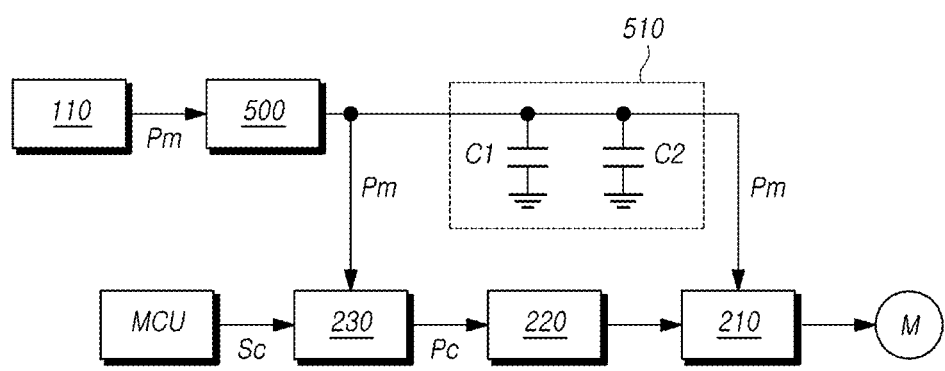
FIG. 5 is another diagram schematically showing a motor driving control apparatus according to an embodiment of the present disclosure.

FIG. 5 is another diagram schematically showing a motor driving control apparatus 100 according to an embodiment of the present disclosure.

Referring to FIG. 5, the motor driving control apparatus 100 according to an embodiment of the present disclosure may further include a reverse voltage prevention circuit 500 which is connected between the motor driving power source 110 and the inverter circuit 210 and prevents occurrence of a reverse voltage between the motor driving power source 110 and the inverter circuit 210.

The reverse voltage prevention circuit 500 may include one or more transistors and may further include one or more diodes and/or one or more resistors.

The transistors included in the reverse voltage prevention circuit 500 may be high-current p-channel FETs or n-channel FETs.

Since voltage drop of the transistors is much less than that of general diodes due to characteristics thereof, the transistors may remarkably increase driving efficiency.

Figure 6:
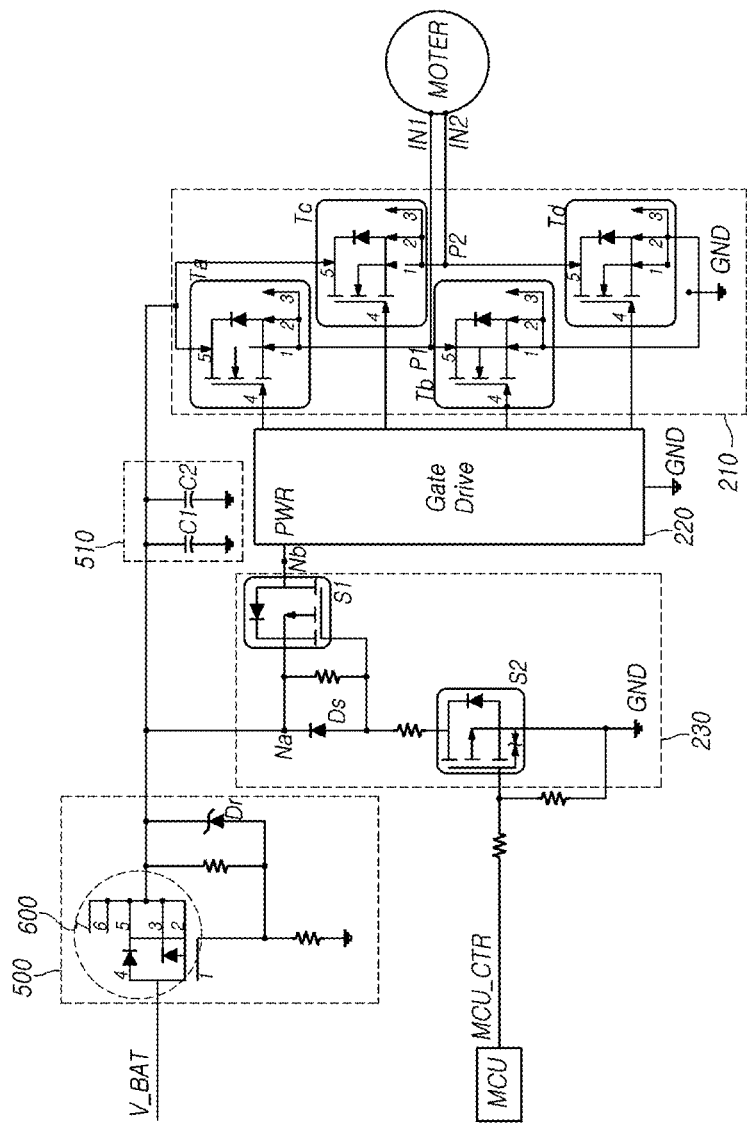
FIG. 6 is a diagram showing an implementation example of a motor driving control apparatus according to an embodiment of the present disclosure.
Figure 7:
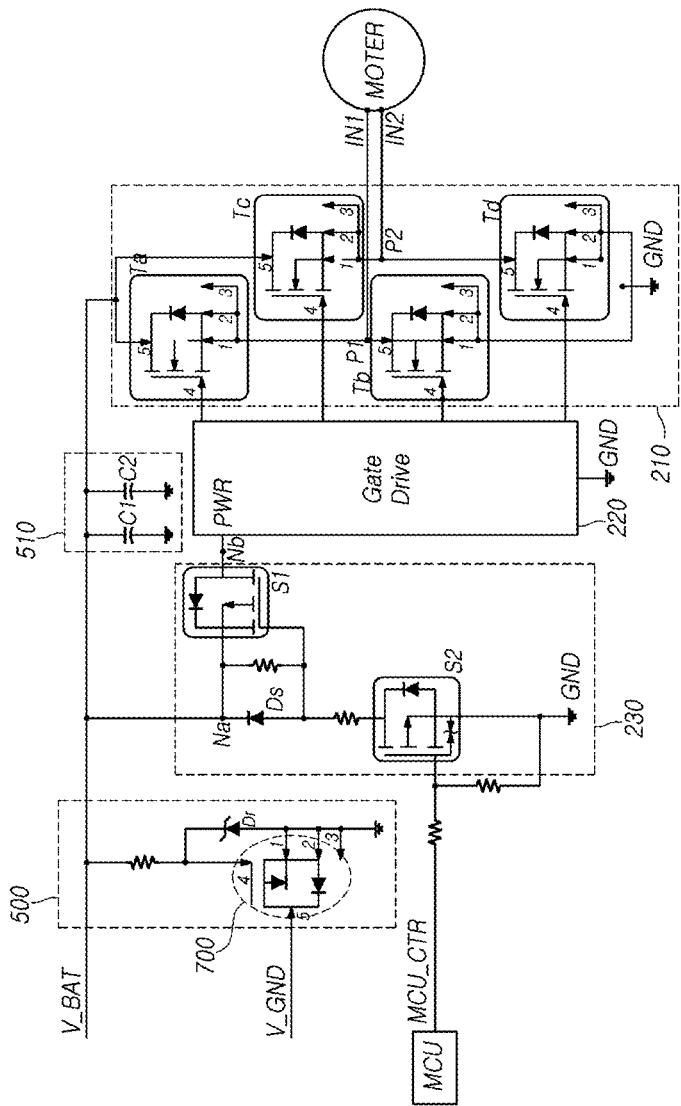
FIG. 7 is a diagram showing another implementation example of a motor driving control apparatus according to an embodiment of the present disclosure.

The above-described reverse voltage prevention circuit 500 may further include at least one diode Dr as shown in FIGS. 6 and 7.

Meanwhile, the motor driving control apparatus 100 according to an embodiment of the present disclosure may include a direct current link capacitor circuit 510 including one or more capacitors C1 and C2 electrically connected between the reverse voltage prevention circuit 500 and the inverter circuit 210.

As described above, when high-current transistors are used in the reverse voltage prevention circuit 500, it is possible to ensure tolerance for inrush current by charging the capacitors in the direct current link capacitor circuit 510 such that a charge and discharge circuit may be removed.

Also, as described above, when high-current transistors are used in the reverse voltage prevention circuit 500, mechanical relay is not used, and thus it is unnecessary to configure a driving circuit.

FIGS. 6 and 7 are diagrams showing implementation examples of the motor driving control apparatus 100 according to embodiments of the present disclosure.

FIG. 6 is a diagram showing an implementation example of a case in which high-current transistors in the reverse voltage prevention circuit 500 are high-current p-channel FETs, and FIG. 7 is a diagram showing an implementation example of a case in which high-current transistors in the reverse voltage prevention circuit 500 are high-current n-channel FETs.

Referring to FIGS. 6 and 7, the motor driving power source 110 may be an in-vehicle battery, and the motor driving power Pm supplied by the motor driving power source 110 may be a battery power V_BAT.

Also, referring to FIGS. 6 and 7, the control power Pc input to a power input terminal PWR of the motor control circuit 220 by the switch circuit 230 may be the battery power V_BAT, which is input to and passed through the switch circuit 230, corresponding to the motor driving power Pm.

Referring to FIGS. 6 and 7, the inverter circuit 210 may include a plurality of transistors Ta, Tb, Tc, and Td for controlling supply of the battery power V_BAT corresponding to the motor driving power Pm to the motor M.

Each of the plurality of transistors included in the inverter circuit 210 may apply the motor driving power Pm to each phase of the motor M when a gate thereof is driven. For example, each transistor of the inverter circuit 210 may control a rotation speed of the motor M and whether to rotate the motor M by sequentially applying the motor driving power Pm to each phase of the motor M.

Referring to FIGS. 6 and 7, the motor control circuit 220 may control on/off of each of the plurality of transistors Ta, Tb, Tc, and Td by driving gates of the plurality of transistors Ta, Tb, Tc, and Td when the control power Pc is input.

Each of the plurality of transistors Ta, Tb, Tc, and Td has a gate node controlled by the motor control circuit 220, which may be referred to as a gate driver, a first node (e.g., a source node or a drain node), and a second node (e.g., a drain node or a source node).

The transistors Ta and Tc and the transistors Tb and Td may be pull-up transistors and pull-down transistors, respectively, which are turned on and off in opposite manners.

In other words, the transistors Ta and Tc may be pull-up transistors, and the transistors Tb and Td may be pull-down transistors.

A second node (e.g., a drain node or a source node) of each of the transistors Ta and Tc may be electrically connected to a first node (e.g., a source noce or a drain node) of each of the transistors Tb and Td.

In other words, a second node (e.g., a drain node or a source node) of the transistor Ta may be electrically connected to a first node (e.g., a source noce or a drain node) of the transistor Tb.

That is, a point P1 at which the second node (e.g., a drain node or a source node) of the transistor Ta and the first node (e.g., a source noce or a drain node) of the transistor Tb are connected may be electrically connected to an input node IN1 of the motor M.

A second node (e.g., a drain node or a source node) of the transistor Tc may be electrically connected to a first node (e.g., a source noce or a drain node) of the transistor Td.

That is, a point P2 at which the second node (e.g., a drain node or a source node) of the transistor Tc and the first node (e.g., a source noce or a drain node) of the transistor Td are connected may be electrically connected to an input node IN2 of the motor M.

The battery power V-BAT corresponding to the motor driving power Pm may be applied to a first node (e.g., a source noce or a drain node) of each of the transistors Ta and Tc.

A voltage (e.g., a ground voltage GND) which cannot drive the motor M may be applied to a second node (e.g., a drain node or a source node) of each of the transistors Tb and Td.

As an example of transistor operation, when the motor control circuit 220 outputs a turn-on level voltage for turning on the transistor Ta and a turn-off level voltage for turning off the transistor Tb, the transistor Ta is turned on, and the transistor Tb is turned off.

Accordingly, the transistor Ta, which is turned on by the turn-on level voltage input to the gate node (the control node), outputs the battery power V_BAT, which is input to the first node (e.g., a source noce or a drain node), to the second node (e.g., a drain node or a source node).

The motor M may be driven by being supplied with the battery power V_BAT corresponding to the motor driving power Pm through the second node (e.g., a drain node or a source node) of the transistor Ta.

As another example of transistor operation, when the motor control circuit 220 outputs a turn-on level voltage for turning on the transistor Tb and a turn-off level voltage for turning off the transistor Ta, the transistor Tb is turned on, and the transistor Ta is turned off.

Accordingly, the transistor Tb, which is turned on by the turn-on level voltage input to the gate node (the control node), outputs the ground voltage GND electrically connected to the second node (e.g., a drain node or a source node) to the first node (e.g., a source noce or a drain node).

The motor M is supplied with the ground voltage GND rather than the battery power V_BAT corresponding to the motor driving power Pm through the first node (e.g., a source noce or a drain node) of the transistor Tb and thus cannot be driven.

Referring to FIGS. 6 and 7, the switch circuit 230 may include a first switch element S1 which inputs the battery power V_BAT, which may be the motor driving power Pm corresponding to the control power Pc, to the motor control circuit 220 when turned on, a second switch element S2 which controls on/off of the first switch element S1 in response to the control signal Sc, which is an MCU control signal MCU_CTR output from the MCU, and the like.

Meanwhile, the switch circuit 230 may additionally include at least one diode Ds.

When no steering function failure has been sensed, the above-described switch circuit 230 may be turned on by the control signal Sc which is the MCU control signal MCU_CTR applied to a gate node of the second switch element S2.

Accordingly, the ground voltage GND is applied to a gate node of the first switch element S1 through the turned-on second switch element S2.

When the first switch element S1 is a P-type transistor, the first switch element S1 is turned on by the ground voltage GND applied to the gate node of the first switch element S1.

Accordingly, the first switch element S1 outputs the battery power V_BAT applied to a node Na to a node Nb such that the switch circuit 230 may input the battery power V_BAT corresponding to the control power Pc to a power input terminal PWR of the motor control circuit 220.

Therefore, the inverter circuit 210 performs an appropriate operation such that the motor M may perform an operation for steering assist.

When a steering function failure is sensed, the second switch element S2 may be turned off by the control signal Sc which is the MCU control signal MCU_CTR applied to the gate node.

In this case, the ground voltage GND is not applied to the gate node of the first switch element S1.

When the first switch element S1 is a P-type transistor, the first switch element S1 is not turned on and is turned off.

Accordingly, the first switch element S1 cannot output the battery power V_BAT applied to the node Na to the node Nb such that the switch circuit 230 may not input the battery power V_BAT corresponding to the control power Pc to the power input terminal PWR of the motor control circuit 220.

Therefore, the inverter circuit 210 does not perform an appropriate operation such that the motor M may not perform an operation for steering assist.

Meanwhile, to block the battery power V_BAT to the motor driving power Pm, mechanical relay is not applied to a battery line, and an electronic element is used to block a control power applied to the gate driver which is the motor control circuit 220. In this way, it is possible to reduce a size of the motor driving control apparatus 100 and prevent noise caused by a switching operation.

Referring to FIGS. 6 and 7, the motor driving control apparatus 100 may further include at least one resistor in the switch circuit 230, the reverse voltage prevention circuit 500, and the ike, and may further include at least one resistor at a point where various signals are input and output.

Meanwhile, the above-described switch circuit 230 may be composed of one switch element. For example, the switch circuit 230 may be composed of a switch element which inputs the motor driving power Pm corresponding to the control power Pc to the motor control circuit 220 when turned on by the control signal Sc. Here, the switch element denotes one element in which the above-described functions of the first switch element S1 and the second switch element S2 are integrated.

For example, the MCU control signal MCU_CTR may be directly applied to a gate node of the switch element configured in the switch circuit 230, and the switch element may be turned on by the control signal Sc which is the applied MCU control signal MCU_CTR.

When the switch element is turned on, the switch element outputs, to the node Nb, the battery power V_BAT applied to the node Na such that the switch circuit 230 may input the battery power V_BAT corresponding to the control power Pc to the power input terminal PWR of the motor control circuit 220.

In other words, the switch circuit 230 may be composed of two switch elements or one switch element to which the control signal Sc is directly applied.

The above-described steering system 10 according to an embodiment of the present disclosure may be applied to various types of steering systems.

Some application examples will be briefly described below.

Figure 8:
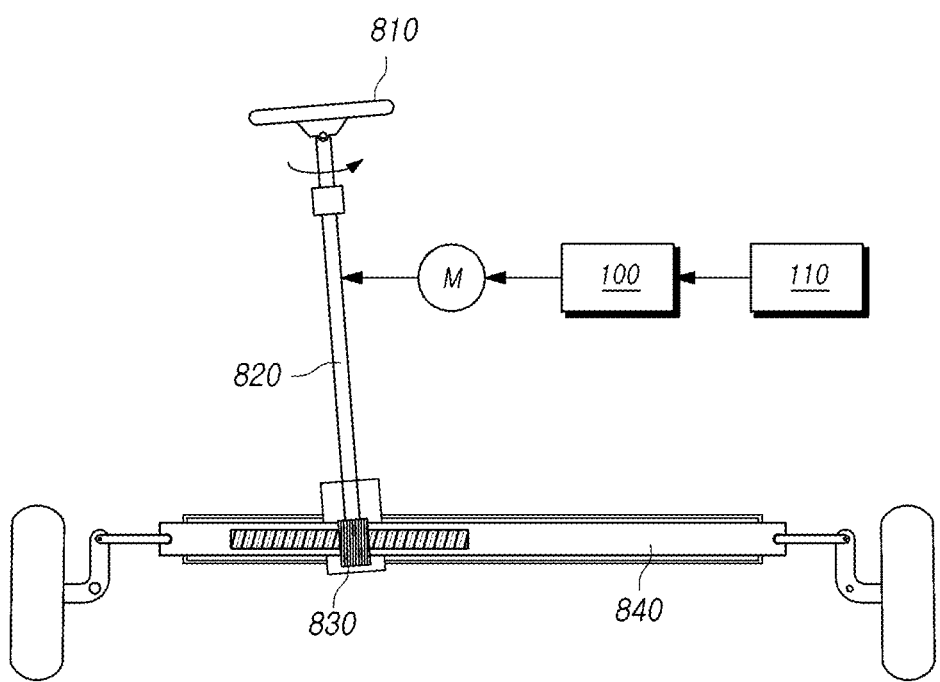
FIGS. 8 to 10 are diagrams showing implementation examples of a steering system according to embodiments of the present disclosure.
Figure 9:
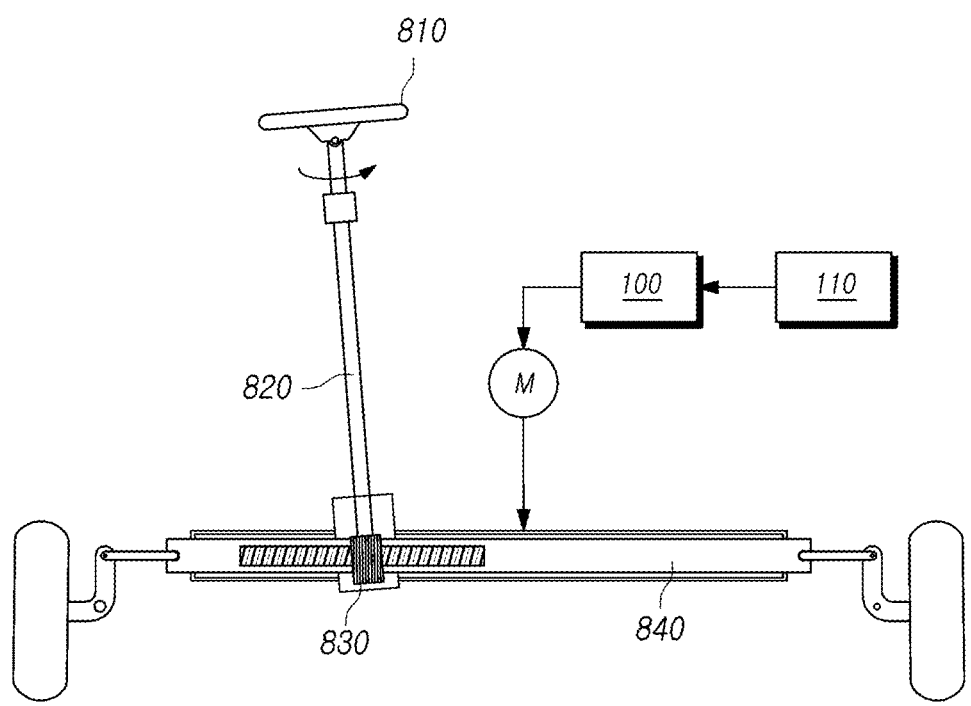
Figure 10:
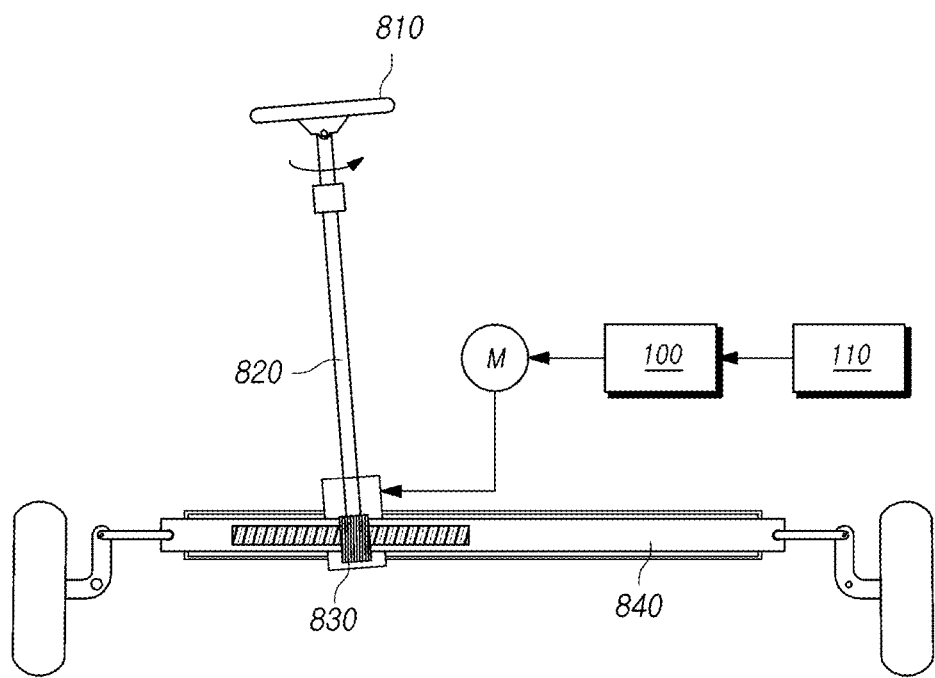

FIGS. 8 to 10 are diagrams showing implementation examples of the steering system 10 according to embodiments of the present disclosure.

Referring to FIGS. 8 to 10, mechanical steering apparatuses may include a steering wheel 810, a steering shaft 820, a gear box 830, a rack bar 840, and the like.

Here, the steering shaft 820 may include a column (not shown) to which the steering wheel 810 is connected, an intermediate shaft (not shown) which is connected to the column and transmits force (steering force) to the rack bar 840 through the gear box 830, and the like. The gear box 830 may include a pinion gear (not shown).

Referring to FIG. 8, the steering system 10 according to an embodiment of the present disclosure may be a column (C-type) EPS system in which the motor M is connected to the steering shaft 820 and provides an assist steering force to the steering shaft 820.

The motor driving control apparatus 100 shown in FIG. 8 may control driving of the motor M which provides an assist steering force to the steering shaft 820.

Referring to FIG. 9, the steering system 10 according to an embodiment of the present disclosure may be a rack (R-type) EPS system in which the motor M is connected to the rack bar 840 and provides an assist steering force to the rack bar 840.

The motor driving control apparatus 100 shown in FIG. 9 may control driving of the motor M which provides an assist steering force to the rack bar 840.

Referring to FIG. 10, the steering system 10 according to an embodiment of the present disclosure may be a pinion (P-type) EPS system in which the motor M is connected to the pinion gear in the gear box 830 and provides an assist steering force to the pinion gear.

The motor driving control apparatus 100 shown in FIG. 10 may control driving of the motor M which provides an assist steering force to the pinion gear in the gear box 830.

The motor driving control apparatus 100 in the steering system 10 according to the above-described embodiments of the present disclosure may be implemented as an electronic control unit (ECU).

As described above, the above-described embodiments of the present disclosure may provide the motor driving control apparatus 100 and the steering system 10 for, when a failure occurs inside or outside the steering system 10, immediately stopping motor driving for steering assist and thereby preventing a vehicle accident.

Also, the embodiments of the present disclosure may provide the motor driving control apparatus 100 which may be miniaturized and may prevent noise caused by motor driving control, and the steering system 10 including the same.

The above embodiments of the present disclosure have been described only for illustrative purposes, and those skilled in the art will appreciate that various modifications and changes may be made thereto without departing from the scope and spirit of the disclosure. Therefore, the embodiments of the present disclosure are not intended to limit, but are intended to illustrate the technical idea of the present disclosure, and the scope of the technical idea of the present disclosure is not limited by the embodiments. The scope of the present disclosure shall be construed on the basis of the accompanying claims in such a manner that all of the technical ideas included within the scope equivalent to the claims belong to the present disclosure.

What is claimed is:

1. A motor driving control apparatus comprising:
an inverter circuit configured to supply a motor driving power to a motor for steering assist;
a motor control circuit configured to control operation of the inverter circuit according to whether a control power is input; and
a switch circuit configured to control whether to input the control power to the motor control circuit in response to a control signal.

2. The motor driving control apparatus of claim 1, wherein the motor control circuit controls the inverter circuit to supply the motor driving power to the motor when the control power is input, and controls the inverter circuit not to supply the motor driving power to the motor when input of the control power is interrupted.

3. The motor driving control apparatus of claim 1, wherein the inverter circuit includes a plurality of transistors configured to control supply of the motor driving power to the motor, and
the motor control circuit controls on/off of each of the plurality of transistors by driving gates of the plurality of transistors when the control power is input.

4. The motor driving control apparatus of claim 3, wherein each of the plurality of transistors applies the motor driving power to each phase of the motor when a gate thereof is driven.

5. The motor driving control apparatus of claim 1, further comprising a reverse voltage prevention circuit configured to be connected between a motor driving power source configured to supply the motor driving power and the inverter circuit and prevent occurrence of a reverse voltage between the motor driving power source and the inverter circuit.

6. The motor driving control apparatus of claim 5, wherein the reverse voltage prevention circuit includes a p-channel field effect transistor.

7. The motor driving control apparatus of claim 5, wherein the reverse voltage prevention circuit includes an n-channel field effect transistor.

8. The motor driving control apparatus of claim 5, further comprising a direct current link capacitor circuit including at least one capacitor electrically connected between the reverse voltage prevention circuit and the inverter circuit.

9. The motor driving control apparatus of claim 1, wherein the motor driving power is a battery power.

10. The motor driving control apparatus of claim 1, wherein the control power is the motor driving power.

11. The motor driving control apparatus of claim 10, wherein the switch circuit includes:
a first switch element configured to input the motor driving power corresponding to the control power to the motor control circuit when turned on; and
a second switch element configured to control on/off of the first switch element in response to the control signal.

12. The motor driving control apparatus of claim 11, further comprising a micro control unit configured to output the control signal to the switch circuit according to whether a steering function failure event has occurred.

13. The motor driving control apparatus of claim 10, wherein the switch circuit includes a switch element configured to input the motor driving power corresponding to the control power to the motor control circuit when turned on by the control signal.

14. A steering system comprising:
a motor configured to provide an assist steering force;
a motor driving power source configured to supply a motor driving power for driving the motor; and
a motor driving control apparatus configured to control driving of the motor, wherein the motor driving control apparatus comprises:
an inverter circuit configured to supply the motor driving power to the motor;
a motor control circuit configured to control operation of the inverter circuit according to whether a control power is input; and
a switch circuit configured to control whether to input the control power to the motor control circuit in response to a control signal.

15. The steering system of claim 14, further comprising, inside or outside the motor driving control apparatus, a micro control unit configured to output the control signal to the switch circuit according to whether a steering function failure event has occurred.

16. The motor driving control apparatus of claim 1, wherein the motor control circuit is connected between the inverter circuit and the switch circuit.

17. The steering system of claim 14, wherein the motor control circuit is connected between the inverter circuit and the switch circuit.

18. The steering system of claim 14, further comprising a reverse voltage prevention circuit configured to be connected between a motor driving power source configured to supply the motor driving power and the inverter circuit and prevent occurrence of a reverse voltage between the motor driving power source and the inverter circuit.

19. The steering system of claim 18, wherein the reverse voltage prevention circuit includes a p-channel field effect transistor or an n-channel field effect transistor.

20. The steering system of claim 18, further comprising a direct current link capacitor circuit including at least one capacitor electrically connected between the reverse voltage prevention circuit and the inverter circuit.

* * * * *